April 29, 1958 H. H. RADKE ET AL 2,832,675
CATALYST HOLDER AND SUPPORT UNIT
Filed Dec. 6, 1951 2 Sheets-Sheet 1
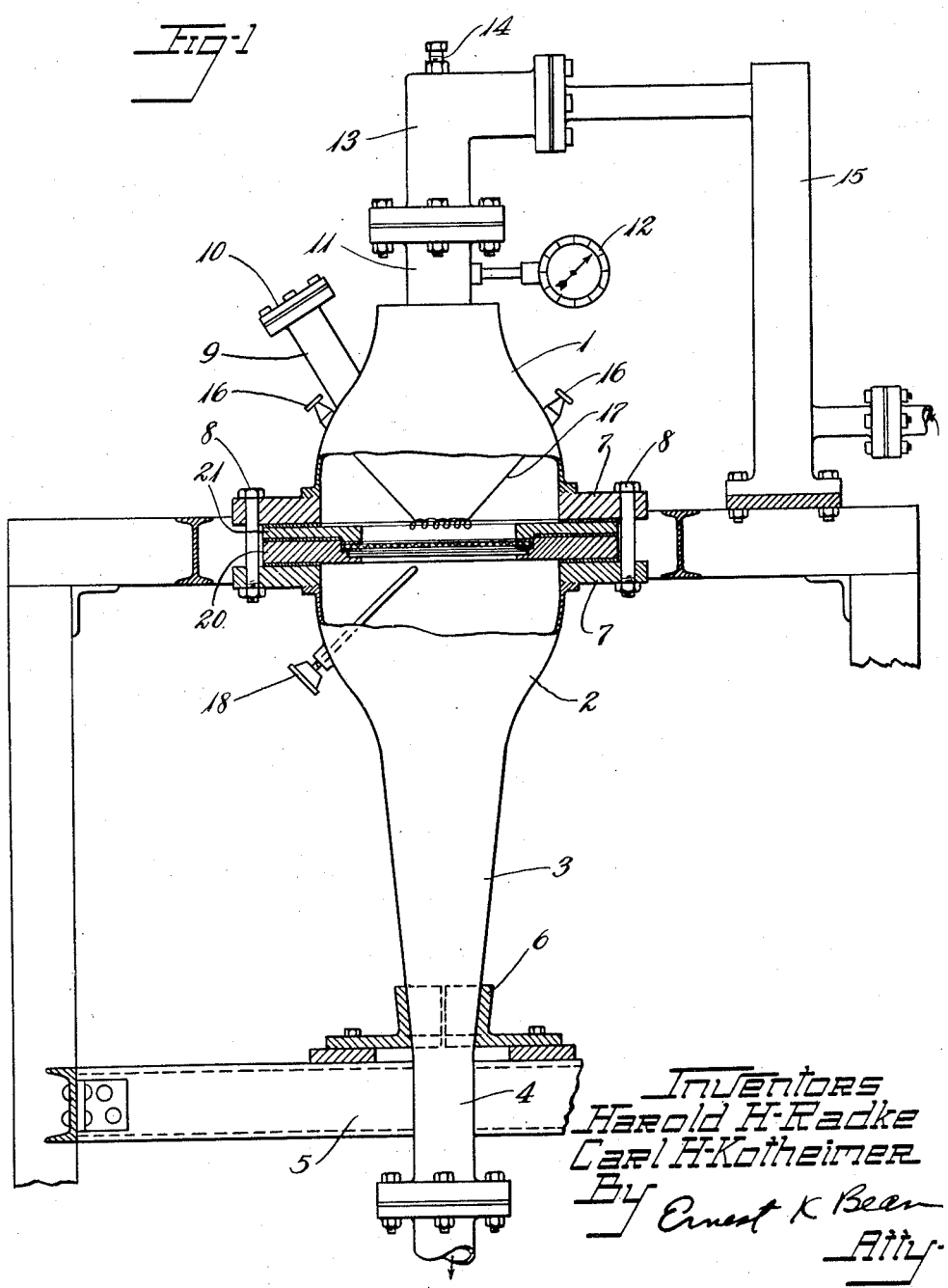
Inventors
Harold H. Radke
Carl H. Kotheimer
By Ernest K. Bean
Atty.

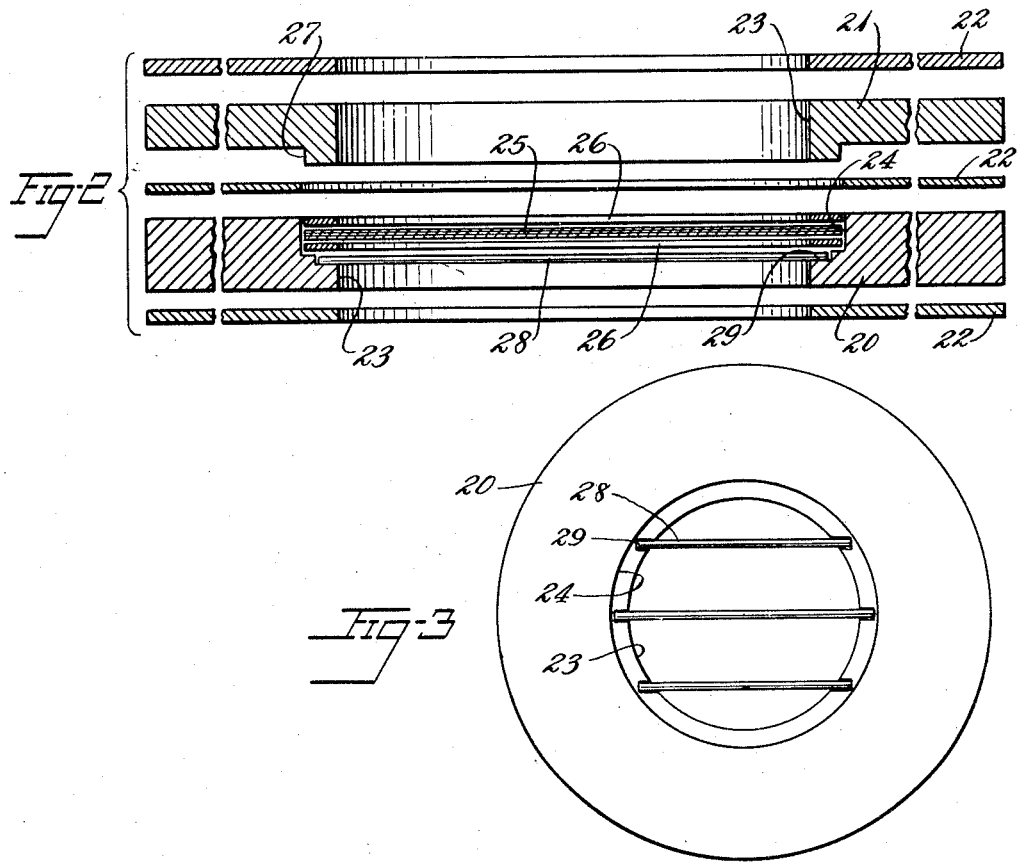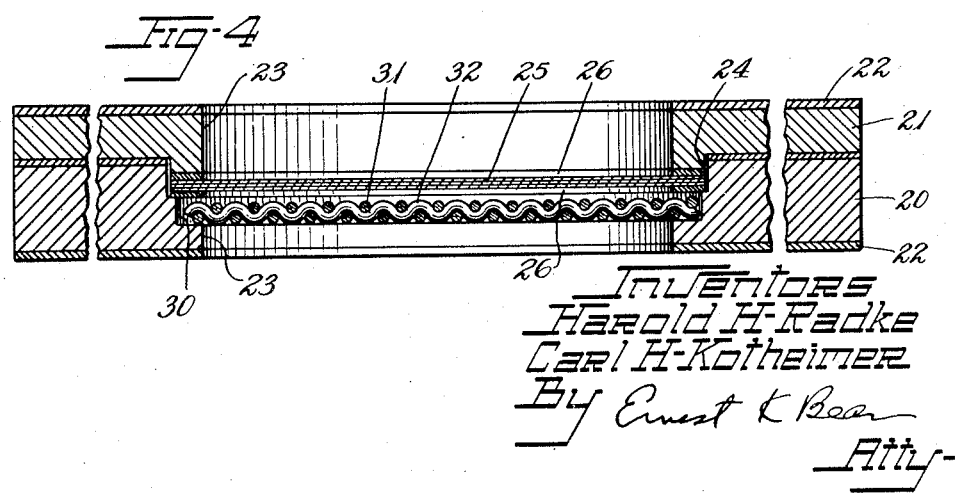

United States Patent Office 2,832,675
Patented Apr. 29, 1958

2,832,675

CATALYST HOLDER AND SUPPORT UNIT

Harold H. Radke and Carl H. Kotheimer, Lorain, Ohio, assignors to The B. F. Goodrich Company, New York, N. Y., a corporation of New York Application December 6, 1951, Serial No. 260,300

3 Claims. (Cl. 23—288)

This invention relates to a process and apparatus for the manufacture of hydrogen cyanide. More particularly, it relates to a process and apparatus for the production of hydrogen cyanide by passing a gaseous mixture of ammonia, a gaseous hydrocarbon, such as methane, and the requisite amount of oxygen from a gas comprising free oxygen, such as air, through a platinum metal catalyst maintained at 750 to 1250° C. or slightly higher.

The method of producing hydrogen cyanide by reacting ammonia and a hydrocarbon is described by Andrussow in U. S. Patent 1,934,838. By this method, hydrogen cyanide results from the exothermic catalytic reaction of passing ammonia, at least one hydrocarbon, particularly methane or natural gas, and oxygen, or gases containing the same, at elevated temperatures over an oxidation catalyst, such as platinum metals or alloys of them. The amount of oxygen employed must be sufficient to make the normally endothermic reaction exothermic.

Because of the similarity between the hydrogen cyanide synthesis and the ammonia oxidation process, much of the early work done in hydrogen cyanide production methods attempted to make use of this similarity. For example, many years of development work in the ammonia oxidation industry have resulted in the almost universal acceptance of a foraminous grid-like or gauze-like platinum-rhodium alloy catalyst. The early work of Andrussow showed that a platinum metal catalyst similar to that used in ammonia oxidation was the most satisfactory one in the hydrogen cyanide reaction. This catalyst has shown improved high temperature qualities over the pure platinum gauze resulting in lower platinum loss and longer catalyst life, although the relatively pure platinum metal itself may be utilized and is included herein in the term "platinum metal catalyst."

Most of the difficulty in obtaining high conversion-per-pass in the hydrogen cyanide process may be traced to poisoning of the catalyst. Touching the platinum metal catalyst with the human hands leaves sufficient foreign material as to drastically lower conversion. Consequently the catalyst must be pickled, washed and dried before re-use. Slight traces of carbon deposited on the catalyst through localized cooling is sufficient to weaken it. Iron and nickel and their compounds coming in contact with the catalyst will seriously reduce conversion. Small particles of iron rust or of other metals caused by corrosion or pitting of equipment when deposited on the catalyst not only poison it but fuse into the catalyst so as to require complete refining of the catalyst metal. While nickel and its alloys has been used with success as a material of construction in the ammonia oxidation industry, it has been found that it promotes the decomposition of hydrogen cyanide to a greater extent than other metals and actually is, in fact, a reverse catalyst for the hydrogen cyanide reaction and causes lowering of conversion by as much as one-quarter to one-half or more. Therefore, for maximum conversion and to prevent catalyst loss, as well as to increase catalyst life, these and other foreign materials must not come into contact with the catalyst.

The platinum metal catalysts have been used in the form of foraminous sheets, woven wire, netting of gauze, cast or molded plates and grids or the like, the preferred form being one or more superimposed layers of fine woven wire gauze made of the catalytic metal through which the reactant gases are passed. In practicing the hydrogen cyanide processes considerable difficulty also has been encountered in the use of these foraminous forms of the platinum metal catalyst because of carbon deposition on the catalyst and corrosion or fusing of the catalyst at places of contact between the catalyst and the reaction vessel walls. Because of this difficulty it has been proposed in U. S. Patent 1,957,749 to clamp the gauze between ceramic or refractory rings and then flush the catalyst edges with a carbon-free gas. This method has the disadvantage of diluting the reaction mixture and reducing the effective active area of the catalyst. Additionally, the platinum metal is very weak at reaction temperatures of 750 to 1250° C. or slightly higher and as a result, it is desirable to prevent sagging and stretching of the gauze by plastic flow. It has been proposed to construct these catalysts in the form of cones and other shapes having greater inherent structural strength than a flat sheet but, however, these expedients are extremely expensive due to fabrication difficulties and to the greatly increased amount of the precious platinum required and do not prevent catalyst rupture or failure due to sag. Up to the present time no completely satisfactory means of holding and supporting the platinum metal catalysts have been devised.

It is among the objects of this invention, therefore, to provide a means for holding and supporting the foraminous types of platinum metal catalysts which are free from these difficulties. Other objects will become apparent in the description which follows We have discovered that the above-described difficulties in holding and supporting the platinum metal oxidation catalysts are overcome by the use of a catalyst holder and support unit adapted to be disposed in a vertical gas conduit or reaction vessel normal to the direction of flow therein and to cover the entire cross section thereof. This catalyst unit eliminates edge cooling difficulties by positioning the catalyst layer between novel holder rings or plates so as to be wholly within the hot gas stream and out of contact with the cooler outside walls of the reaction vessel. Sagging of the catalyst is prevented by mechanical support afforded by a foraminous support element associated with the holder rings or plates and constructed of a material inert both to the gaseous reactants and to the platinum metal catalyst at the temperature of reaction.

Due to the extremely rigorous conditions obtaining in the reaction zone, both of high temperature and extreme corrosiveness of the gaseous reactants and reaction products at such high temperatures, the choice of materials for the construction of the catalyst holder and support unit is quite limited. Refractory materials known to be chemically resistant and stable at such high temperatures are fragile and difficult to fabricate and handle. For example, quartz has a high melting point and is inert to the catalyst and gases of reaction but upon long exposure to such high temperatures undergoes an internal recrystallization or transformation making it extremely weak and brittle. A more desirable material of construction would be a high temperature metal or alloy because of greater ease of fabrication and handling. All the metals tested, however, proved undesirable. The following table shows the results of test on various metals.

TABLE I

| Material | Cause of Failure |
|---|---|
| Molybdenum | Embrittlement in a few hours' exposure. |
| Tantalum | Corrosion. |
| Nichrome | Reverse catalyst for reaction. |
| Silicon carbide | Catalyst poison. |
| Monel | Do. |
| Inconel | Do. |

Of the materials tested certain stainless steels were found, surprisingly in spite of their nickel content, to have virtually no effect on the reaction and were deemed suitable as material of construction for the catalyst holder plates and catalyst support element. Stainless steels successfully employed were AISI types 310, 316, 347 and the like. These steels form a recognized class of austenitic stainless steels having a low effective carbon content and possessing a total alloy content of at least 26% by weight, principally of chromium and nickel in proportions enabling them to retain at ordinary temperatures the fine grain structure characteristic of austenitic steels. Steels of this type containing 16 to 30% chromium and 10 to 22% nickel together with the usual small amounts of carbon, silicon and manganese are suitable. By "low effective carbon content" is meant a steel either low in actual carbon content or stabilized against intergranular carbide precipitation by small amounts of added titanium, columbium, molybdenum and the like. These steels which are more fully described in our copending application, Serial No. 260,301, filed December 6, 1951, are extremely resistant to intergranular corrosion, retain a considerable portion of their structural strength and rigidity at temperatures in excess of 1250° C. and are the most suitable materials of construction found for the catalyst holder plates.

Other metals which are not distorted under their own weight or a small load at temperatures up to 1250° C. and higher such as Nichrome and other high nickel-chrome alloys, nickel, Monel, Inconel, and other alloys of iron, chromium, nickel and copper which are easily corroded by or have an adverse catalytic effect on the hydrogen cyanide reaction are particularly statisfactory materials of construction for the catalyst support when they are protected by a surface covering of a high temperature refractory or siliceous material inlet to the reaction and to the catalyst. Quartz, natural and synthetic, high silica glass such as "Vycor" which consists principally of 90 to 92% silica and the remainder chiefly boric oxide, and the fused, vitreous high chromia and calcined alumina ceramics do not fuse to or poison the catalyst and therefore are suitable covering materials for protecting the metal support element in the areas of contact with reactant gases and the catalyst. These materials may be made into tubes and other shapes and shipped over a metal core or support element or cast or coated thereon to form a structurally rigid, easily handled and extremely inert catalyst support element. The fused, vitreous high chromia and calcined alumina ceramics may be coated on a foraminous metal support element and integrally fused thereto to form a very durable coating. The latter are particularly preferred covering materials because they provide a means of covering foraminous support elements of more complex configuration such as woven wire grids etc. which have relatively less contact area with the catalyst layer and are much preferred.

The high temperature chromia and calcined alumina ceramic coatings are applied usually as an aqueous slip, then dried and finally fused to a continuous, impervious vitreous coating resembling porcelain enamel. The fused coating should have expansion characteristics closely similar to the base metal and be as thin as practicable so as to minimize cracking and chipping. The coefficient of expansion of the coatings is adjusted to that of the base metal by refractory mill additions and by the use of a frit of adjusted composition. The thickness of the coating should be less than 0.02 inch in thickness, with optimum thickness being from 0.002 to 0.004 inch. The enamel slips for high temperature application are prepared and applied, we believe, in the same general manner as commercial enamel slips, except for the use of refractory mill additions, a frit of higher smelting temperature, and slightly increased water content and fineness of milling. The metal core is dipped into or sprayed with the slip, allowed to dry if desired and then is fired at temperatures of 1800° F. or much higher, depending on the maturing temperature of the coating, and the gage, size and shape of the base metal.

An illustrative coating is made by first smelting the following materials at 2425° F.:

*Frit composition*

| | Parts by weight |
|---|---|
| Flint | 38 |
| $BaCO_3$ | 56.63 |
| Boric acid | 11.50 |
| $CaCO_3$ | 7.14 |
| BeO | 2.50 |
| ZnO | 5.00 |

The molten composition is poured into water whereby it is disintegrated to a fine gritty powder. An enamel slip is made having the following composition:

| | Parts by weight |
|---|---|
| Frit (above) | 700 |
| $Cr_2O_3$ | 300 |
| Enamelers clay | 50 |
| Water | 400 |

This composition is then ball milled until the components are reduced to a state of subdivision and dispersion adapted to yield continuous, thin coatings. A metal base member, which has been freshly picked and washed, is dipped into the resulting slip, allowed to dry, then fired at a temperature adapted to fuse and vitrify the coating (usually of the order 1800° F. or higher), and if necessary, cooled under controlled conditions to secure a coating free of defects.

In the above composition the frit is the fluxing agent which melts and combines during vitrification with the chromic oxide to form an inert, high temperature resistant ceramic coating. Calcined aluminum oxide and chromium oxide in amounts ranging from 25 to 100% by weight based on the weight of frit form coatings suitable for use in this invention.

The process and the apparatus of the present invention is more easily understood with reference to the accompanying drawings, of which:

Fig. 1 is an elevation, partially in section, of a converter or reaction vessel in which is disposed the catalyst holder and support unit of this invention;

Fig. 2 is an exploded view, in section, of one embodiment of the catalyst unit of this invention which employs rod-like catalyst support elements covered with a refractory or ceramic material;

Fig. 3 is a plan view showing the disposition of the rod-like support elements of Fig. 2;

Fig. 4 is an enlarged sectional view of a pair of catalyst holder plates showing the disposition therein of a wire grid type catalyst support element having a fused vitreous ceramic coating.

Referring to Fig. 1, the apparatus is seen to comprise a converter formed of a conical upper body section 1 and a conical lower body section 2. The lower body section 2 is welded to a venturi nipple section 3 which in turn is welded to a straight stub-end nipple 4. The lower body section 2 is supported by a beam structure 5, the tapered sides of the venturi nipple resting in a tapered collar arrangement 6 which is adapted to be easily removed for lowering the bottom body section during disassembly. To each of the body sections there is welded a slip-on type flange 7 provided with bolts 8, 8 for joining the two body sections.

The upper body section 1 is provided with a welded-on nipple 9 to which is attached a sight glass fitting 10 for observance of the catalyst zone of the reactor. At the top of the upper body section there is welded a short flanged nipple section 11 into which is tapped a pressure gage 12 for measuring incoming gas pressure. To the nipple 11 there is bolted a flanged 90-degree elbow fitting 13 which is fitted with a thermocouple 14 for measuring incoming gas preheat temperature. Attached to the elbow fitting 13 is a vertical, baffled gas mixer section 15 which insures efficient intermixture of the gaseous reactants before entering the reaction zone. The upper body section 1 is fitted with two insulated electrodes 16, 16 to which is attached an electric resistance coil 17 for starting the reaction. The starting coil is supported very close, i. e. about 1/8 to 1/4 inch, to the reaction zone defined by the flanges 7, 7. The lower body section 2 is provided with a thermocouple 18 for measuring catalyst temperature. The converter described is simple to construct and is easily disassembled for cleaning and maintenance simply by dropping the lower body section 2.

The catalyst holder and support unit of this invention is disposed in the above-described converter body in the reaction zone defined between the flanges 7, 7 and comprises a lower catalyst holder plate 20 and an upper catalyst holder plate 21, the details of which are more easily identified by reference to the exploded view of Fig. 2. Plate gaskets 22, 22 of a heat-resistant material such as asbestos are provided to make a pressure-tight seal between the plates 20, 21 and against the flanges 7, 7 when the bolts 8, 8 are tightened. Each of the catalyst holder plates 20, 21 have an internal periphery or diameter 23 which is considerably smaller than the internal diameter of the converter body sections so that a considerable portion of the area of the plates 20, 21 is exposed to the heating effects of the gaseous reactants. In the top edge of lower plate 20 there is a circular groove or recess 24 into which there is fitted a foraminous catalyst layer 25 which in the drawings is illustrated as being a plurality of superimposed layers of fine platinum wire screening. For the purpose of forming a gas-tight seal about the edges of the catalyst layer 25 there are provided asbestos or Spirotallic (asbestos encased in metal rings) edge seal gaskets 26, 26. The gaskets 26, 26 also prevent fusion of the catalyst layer to the catalyst holder plates 20, 21. The upper catalyst plate or ring 21 is provided with a circular projection or shoulder 27 which fits into the recess 24 in the lower ring and when urged downwardly exerts pressure on the gaskets 26, 26 and tightly grips the edges of the catalyst layer 25.

The catalyst layer 25 is supported in the embodiment of Figs. 1, 2 and 3 by a plurality of Nichrome supporting rods 28, 28 which are fitted into milled slots 29, 29 in lower plate 20. Fig. 3 is a plan view showing three of the rods 28, 28 spaced equally across the internal diameter 23 of the catalyst unit. It will be noted that the rods 28, 28 in Fig. 2 do not contact the catalyst layer 25. However, in operation the catalyst layer will sag slightly to come into contact with the rods 28, 28. While the rods could be fitted flush with the bottom edge of the recess 24 and thus make initial contact with the catalyst layer 25 it is preferred to let the catalyst sag slightly during operation and thus eliminate possible catalyst damage during assembly and tightening of the bolts 8, 8. The rods 28, 28 as illustrated in Figs. 1 to 3 are provided with tube-like slip-on coverings of "Vycor" glass which are too thin to illustrate on the scale of the drawings. The rods 28, 28 could also be provided with a thin integrally fused high chromia or calcined alumina ceramic coating as hereinabove described.

The supporting element, which in the embodiment of Figs. 1 to 3 is a plurality of small rods, may take other forms such as grids, plates having a plurality of holes, a wire mesh considerably coarser than the catalyst layer 25, and many others. The preferred form of the catalyst support is illustrated in Fig. 4. In this figure, the catalyst holder plates, gaskets, catalyst layer and the other parts are given the same identifying numerals as in the other figures. However, the lower plate 20, is provided with a second circular groove or recess 30 below the catalyst retainer recess 24 adapted to receive the catalyst support 31. In this case the catalyst support 31 is woven of heavy Nichrome or other heat resistant metal wire with a deep crimp so as to form a plurality of crests 32. It is provided with an integrally fused ceramic coating having a thickness of less than 0.02 inch. In this form of the catalyst support element 31 the catalyst layer 25 is supported on the great number of crests, the contact area being so small as not to cool the catalyst metal to any extent. In either of the embodiments shown in the drawings the support element may be welded to the lower catalyst holder plate 20 in any position adapted to come in contact with the catalyst layer 25 when the latter sags slightly after reaching red heat. It is preferred, however, that the support element be easily removable for replacement and cleaning.

The catalyst holder and support unit just illustrated is assembled in sandwich fashion and then slid between the flanges 7, 7. When the bolts 8, 8 are tightened down a gas tight seal is provided and the catalyst layer is held by its edges only and supported loosely on the rods or grid-like support. During assembly and heat up the catalyst layer is not damaged. During operation the catalyst holder plates 20, 21 have a substantial portion of their total area exposed to the hot reactant gases and are heated thereby to a much higher temperature than the outer walls of the converter. The edges of the catalyst layer 25, therefore, are at approximately the same temperature as the center thereof. Because the rod-like or grid-like catalyst support elements are below the catalyst layer and come in direct contact with heated gases of reaction at temperatures of 750 to 1250° C. or slightly higher, and their area of contact with the catalyst layer 25 is extremely small, the catalyst layer 25 is not cooled appreciably. Thus by being supported by its edge in the center of the hot gas stream by hot holder plates and supported by contact with a hot inert support element, the catalyst layer 25 is not cooled to any substantial extent and carbon deposition is substantially eliminated. The result is a substantial increase in catalyst efficiency and catalyst life which permits long periods of continuous operation at maximum conversion. The apparatus illustrated, including the catalyst holder plates 20, 21 is constructed entirely of an austenitic stainless steel such as types 310, 316 or 347.

In starting up the reaction in the apparatus described, the gas comprising oxygen is preheated and then mixed with ammonia and a gaseous hydrocarbon. The preheat temperature preferably should not exceed 350 to 400° C. because ammonia decomposes above this range. The starting coil 17 is heated to red heat for a few minutes after which a red glow immediately beneath it on the catalyst will be noted. After several minutes the red glow spreads across the catalyst layer 25 and current in the starting coil may be turned off. The reaction is self-supporting as long as the correct ratios of ammonia-hydrocarbon-oxygen are maintained, as is more fully described in our copending applications, Serial Nos. 260,298, and 260,299 filed December 6, 1951, and now abandoned.

When the correct mixture of ammonia, a gaseous hydrocarbon such as methane or natural gas, and oxygen are passed into the converter and downwardly through the catalyst holder and support unit of our invention, conversion of the reactant gases to hydrogen cyanide takes place efficiently and in good yield. Even after many hundreds of hours of continuous operation, the conversion is not materially lessened and the catalyst remains in good condition, results heretofore unobtainable. Catalyst expense and the expense of cleaning and maintenance is greatly reduced. After passage through the catalyst unit the gaseous reactants are cooled and unreacted ammonia recovered and hydrogen cyanide product concentrated by various procedures either well known in the art or disclosed in our copending applications, Serial Nos. 260,302 and 260,303, filed December 6, 1951, the former now Patent No. 2,726,733 and the latter now abandoned.

While the invention has been described with particular reference to certain preferred embodiments thereof it is possible to make variations and modifications therein without departing from the spirit and scope of the invention as defined in the appended claims.

We claim:

1. An improved catalyst holder and support unit for use in the catalytic manufacture of hydrogen cyanide comprising, a pair of mating metallic plates, each of said plates having an aperture defining a gas passageway, a pair of stepped annular recesses adjacent the aperture in one of said plates for receiving and holding the edges of a foraminous catalyst and an associated catalyst support member, and apertured insulating means interposed between said catalyst and the metallic surfaces of said plates and having a gas passageway substantially coextensive with the passageway in said plates to shield the catalyst against direct contact with metallic surfaces, said metallic plates being constructed of austenitic stainless steel having from about 16 to about 26% chromium, from about 8% to about 22% nickel and the remainder substantially iron, said support member being constructed of a metal that is structurally stable at a temperature of about 1250° C. and having a surface coating of a high temperature refractory, said holder plates, catalyst and insulating means being clamped together to form a gas-tight seal about the edges of the catalyst.

2. An improved catalyst holder and support unit for use in the catalytic manufacture of hydrogen cyanide comprising, a pair of mating plates extending inwardly from the walls of a gas conduit, said plates having substantially coinciding apertures therein defining a gas passageway smaller than said conduit and spaced inwardly from the conduit walls, one of said plates having a pair of spaced annular recesses adjacent the aperture and defining separate ledges, one of said ledges receiving and holding the edges of a layer of a foraminous platinum metal catalyst and the other of said ledges receiving and holding a supporting member for the catalyst, the other of said plates having an annular projection extending transversely of said passageway and cooperating with said catalyst holding ledge to clamp said catalyst in gas-tight position across the gas passageway, a plurality of catalyst support rods positioned in milled slots adjacent the support member holding ledge, and apertured insulating means interposed between the catalyst and the metallic surfaces of said plates to shield the catalyst from direct contact with metal surfaces the apertures in said insulating means being substantially coextensive with the gas passageway of said plates, said plates being constructed of a non-catalytic austenitic stainless steel of low effective carbon and containing from about 16% to about 26% chromium, from about 8% to about 22% nickel and the remainder being substantially iron, said catalyst support rods having a core of a metal structurally stable at temperatures of the order of 1250° C. and an outer tube-like covering of a material selected from the class consisting of quartz and high silica glass.

3. An improved catalyst holder and support unit for use in the manufacture of hydrogen cyanide by the process involving passage of a gaseous mixture of ammonia, a gaseous hydrocarbon and a gas comprising free oxygen through a foraminous platinum metal catalyst maintained temperatures of the order of 750° C. to 1250° C. which comprises a pair of catalyst holder plates extending inwardly from the walls of a gas conduit and concentric therewith, a pair of spaced and stepped annular recesses adjacent the passageway in one of said plates, one of said recesses receiving and holding the edges of said catalyst and the other of said recesses receiving and holding a grid-like catalyst support element, the other of said plates having a flange extending along said passageway and cooperating with said catalyst holding recess to clamp the edges of said catalyst and said element in a gas-tight seal, and insulating means interposed between said catalyst, said support element and said plates to shield the catalyst and the catalyst and the catalyst holder against direct contact with the catalyst and the metal surfaces of the reactor, said catalyst holder plates being constructed of a non-catalytic austenitic stainless steel of low effective carbon content and containing from about 8% to about 22% nickel, from 16% to about 30% chromium and the remainder substantially iron, said support element being constructed of a metal alloy of iron, chromium, nickel and copper, said alloy having a heat distortion point in excess of 1250° C. and having an integrally fused vitreous coating selected from the class consisting of high chromia and calcined alumina ceramic coatings.

References Cited in the file of this patent

UNITED STATES PATENTS

| | | |
|---|---|---|
| 1,508,061 | Perley | Sept. 9, 1924 |
| 1,696,528 | Davis et al. | Dec. 25, 1928 |
| 1,889,549 | Hechenbleikner | Nov. 29, 1932 |
| 1,934,838 | Andrussow | Nov. 14, 1933 |
| 2,105,831 | Andrussow | Jan. 18, 1938 |
| 2,156,422 | Baader | May 2, 1939 |
| 2,552,279 | Houpt | May 8, 1951 |
| 2,584,080 | Houpt | Jan. 29, 1952 |
| 2,607,663 | Perry | Aug. 19, 1952 |

FOREIGN PATENTS

| | | |
|---|---|---|
| 394,406 | Great Britain | June 29, 1933 |

OTHER REFERENCES

Zapfee: "Stainless Steels," published by the American Society for Metals, Cleveland, Ohio, 1949, pages 73, 74, 209 and 214.

UNITED STATES PATENT OFFICE

CERTIFICATE OF CORRECTION

Patent No. 2,832,675                                                      April 29, 1958

Harold H. Radke et al.

It is hereby certified that error appears in the printed specification of the above numbered patent requiring correction and that the said Letters Patent should read as corrected below.

Column 3, line 46, for "inlet" read -- inert --; line 55, for "shipped" read -- slipped --; column 4, line 37, for "picked" read -- pickled --; column 8, line 27, after "catalyst", first occurrence, strike out "and the catalyst".

Signed and sealed this 9th day of December 1958.

(SEAL)
Attest:

KARL H. AXLINE                                                  ROBERT C. WATSON
Attesting Officer                                            Commissioner of Patents